United States Patent Office 2,776,132
Patented Jan. 1, 1957

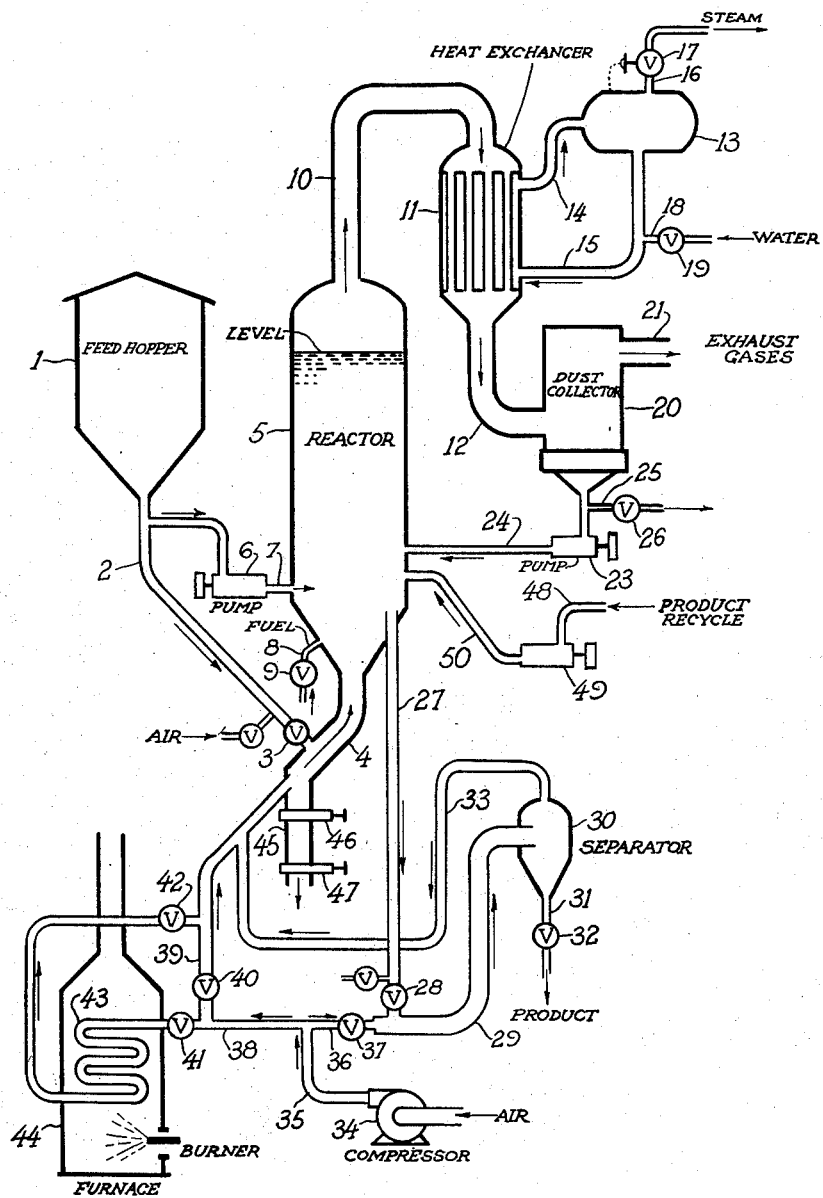

2,776,132

CEMENT MANUFACTURE

Robert Pyzel, Piedmont, Calif.

Application February 6, 1953, Serial No. 335,413

11 Claims. (Cl. 263—53)

My invention relates to improvements in the art of manufacturing hydraulic cements. Among the objectives of my invention are (1) to provide the means for manufacturing cements more economically and (2) to provide means for producing cements of better quality.

Hydraulic cements are manufactured from raw materials containing carbonates such as calcium carbonate and magnesium carbonate, and compounds of silica, alumina, iron oxides, and the like. To convert these materials into hydraulic cement requires that the carbonates are converted to the corresponding oxides by calcining to drive off carbon dioxide, and that these oxides are reacted with the silica, alumina and iron oxide materials to form compounds consisting of combinations such as di-calcium-silicate, tri-calcium-silicate, tri-calcium-aluminate and tetra-calcium-alumino-ferrite.

One of the features of my invention is that all of these reactions, that is, the calcining reactions and the oxides combining reactions, are carried out simultaneously in a single reaction zone. This cement forming reaction zone consists of a bed of fluidized granular particles which is maintained at a temperature in excess of 2000° F.

Another feature of my invention is that the cement forming reaction is carried out in such a manner that the formation of "clinkers" is avoided while the reactants are nevertheless permitted to "flux" when necessary to form the desired product.

Another feature of my invention is that the cement forming reaction may be carried out at much longer reaction time factors than those possible in the kilns used in the cement industry, and as a consequence it is possible, in certain instances depending on the quality of the feed materials and the character of the desired product, to operate the process at lower temperatures.

Another feature of my invention is that the cement forming reaction may be carried out, if desired, at higher temperatures than those attainable in the kilns used in the cement industry, and this may be desirable when producing cements of unusual composition.

Another feature of my invention is that the product produced by my process consists of fully reacted materials.

The combination of these features makes it possible to manufacture cements of more uniform and better quality, and it also provides the means for manufacturing cements of different composition than those now produced commercially and which may be of superior or special quality such as have been demonstrated in laboratory work and reported in the literature.

In accordance with my improved process the feed materials, consisting of carbonate and oxide materials, are first ground to powder in conventional equipment. It is desirable for the effective operation of my process that the feed materials are reduced to a particle size which is smaller than the particle size of the product material which is discharged from the process by the means and procedures referred to below; for example, if the product material is selected and controlled to be of larger than 140 microns minimum particle diameter, then the feed materials should be reduced to smaller than 140 microns maximum particle diameter. However, in the operation of the process it is usually desirable to reduce the feed materials to an even smaller particle size since the finer the feed materials the more effective is the operation of the cement forming reaction zone. In the normal operation of the process, therefore, the largest particles in the feed powder will be much smaller than the smallest particles in the product withdrawn from the process, that is, there will actually be a considerable gap between the relative fineness of the powder charged into the process and the comparative coarseness of the particles withdrawn as product.

The feed powder is charged into the cement forming reaction zone in which a large mass of small particles of cement product material is held in a densely suspended fluidized state, this state being maintained by charging air upwardly through the particle mass at the proper velocity. The fluidized mass may be contained in a suitably insulated vessel consisting, for instance, of a cylindrical metal shell placed in a vertical position and internally lined with a refractory lining material.

The fluidized mass is maintained at the desired reaction temperature, in excess of 2000° F., by charging fuel into the fluidized mass which generates the required heat by combustion with the air passing upwardly through the mass.

The relationship between the amount of feed materials charged into the reaction zone and the amount of material maintained in a fluidized state in the reaction zone, is an important factor in my process for reasons set forth below. While this relationship may be varied over a considerable range, depending on the quality of the feed materials and the operating temperatures, the proper operation of the process requires that the amount of material in the fluidized mass is large compared to the quantities of feed materials charged into the mass, for instance, the weight of material in the fluidized mass may be thirty times, or more, the weight of feed materials charged into the mass per minute.

The feed powders charged into the cement forming reaction zone will be rapidly dispersed into the fluidized mass by reason of its high turbulence characteristics. Because of the large quantity of material in the fluidized mass compared to the stream of feed materials being charged into it, and because of the high temperature at which the fluidized mass is maintained, and because of the fineness of the feed powder, the feed powder is abruptly heated to reaction temperatures. In fact, it may be said that the feed powder particles are subjected to a thermal shock. In the case of the carbonate component of the feed powder, there is the additional sudden generation of carbon dioxide gas within the particles because at the temperature at which the cement forming reactor operates the equilibrium of the equation $$CaCO_3 \rightleftharpoons CaO + CO_2$$

has shifted almost entirely to the right. As a result the feed powder particles, and in particular the carbonate particles, are exposed to a splintering action which further causes a breaking up of the particles to an even greater fineness than the degree of fineness to which the feed material was ground prior to being charged into the cement forming reaction zone, and this further assists in effecting the desired reactions in this zone.

The reactions which take place when the oxides combine to form the cement product are quite complex, and it is not necessary to go into all the ramifications which are known or surmised regarding them, but some aspects of this complex system of reactions must be considered in order to clarify some of the important features of my invention. The following discussion is therefore presented for illustrative purposes and is not meant to be all inclusive, and it is limited to considering only the reactions between the calcium oxide, silica and alumina materials, leaving out other oxide materials which are usually, but not necessarily, present, such as magnesium oxide and iron oxides.

The net effect of the overall reaction is to combine calcium oxide with silica and alumina to form compounds such as di-calcium-silicate, tri-calcium-silicate and tri-calcium-aluminate, as expressed in the following equations:

(1) $\quad 2CaO + SiO_2 \rightarrow 2CaO \cdot SiO_2$
(2) $\quad 3CaO + SiO_2 \rightarrow 3CaO \cdot SiO_2$
(3) $\quad 3CaO + Al_2O_3 \rightarrow 3CaO \cdot Al_2O_3$ These reactions, however, do not all proceed directly as shown by these equations. When the starting oxides are heated to cement forming temperatures, the first compounds formed appear to be the di-calcium-silicate (in accordance with Equation 1 above) and an intermediate compound of calcium oxide and alumina which contains relatively less calcium oxide than the ultimate tri-calcium-aluminate and which is thought to be $5CaO \cdot 3Al_2O_3$.

The di-calcium-silicate continues to react with additional calcium oxide to form tri-calcium-silicate, and the intermediate compound $5CaO \cdot 3Al_2O_3$ reacts with additional calcium oxide to form tri-calcium-aluminate, according to the follows equations:

(4) $\quad CaO + 2CaO \cdot SiO_2 \rightarrow 3CaO \cdot SiO_2$
(5) $\quad 4CaO + 5CaO \cdot 3Al_2O_3 \rightarrow 3CaO \cdot Al_2O_3$ In the overall cement forming reaction, consisting of a combination of reactions such as the five reactions shown above, the intermediate compound $5CaO \cdot 3Al_2O_3$ is a transitory material only which forms by alumina reacting with some calcium oxide and which disappears by further reaction with more calcium oxide. It plays an unusual role in the progress of the overall reaction because it is capable of forming a eutectic mixture with the calcium silicates which melts at the temperatures at which the overall reaction takes place. This melting of the eutectic mixture creates a momentary flux which is helpful to the progress of the overall reaction, but on the other hand, if there is an opportunity for the formation of excessive quantities of the eutectic mixtures then the resulting excessive concentrations of molten material will agglomerate the reactants into large aggregates.

(It is thought that the iron oxides are also capable of forming transitory eutectic mixtures which will melt or fuse during the course of the overall reaction, but the final iron containing products are also stable at the operating temperatures.)

The above outlined progress of the overall oxides combining reaction is a highly simplified version but serves to illustrate the particular point I wish to make, namely, that the materials which cause melting or fusing are transitory in nature—that is, all the final product materials of the overall cement forming reaction, as well as the starting oxides, are stable under the reaction temperatures in the sense that they will neither melt nor dissociate—only certain intermediate compounds (such as $5CaO \cdot 3Al_2O_3$) can cause the temporary formation of materials which may melt at these temperatures.

It is a feature of my invention that these cement forming reactions take place in the presence of large quantities of stable final reaction products which form the bulk of the fluidized mass in the reaction zone. The comparatively small stream of feed materials thoroughly disperses throughout the fluidized mass and the great number of stable particles making up this mass offers an extensive total surface on which the reactant feed particles can collect and react with each other, and to a limited extent with such surface. The momentary formation during these reactions of intermediate compounds or eutectic mixtures which flux at the reaction temperature is in this way dispersed over a large surface area. Such fluxing compounds will continue to react with calcium oxide to form more stable solid products which form new surfaces upon the older surfaces and upon these the series of reactions will repeat as additional feed materials are dispersed in the fluidized mass. Concentrated accumulations of fluxing material are in this manner avoided, and thereby the formation of "clinkers" is prevented, while at the same time the progress of the reactions will cause a gradual but continuous growing in size of the particles constituting the fluidized mass.

Some new particles of product material may also be continuously formed within the fluidized mass by direct reaction between the feed materials introduced into the mass without being affixed to already existing particles of product material, and such newly formed particles will thereafter become the nuclei for further reaction on their surfaces as outlined above. However, depending on the operating conditions and the quality of the feed materials, the rate at which such new particles are formed may not be sufficient to continuously supply within the fluidized mass the required amount of very small product particles to serve as starting points for the building up to larger particles by the growing procedure above referred to. For this reason, and to obtain a positive control over the particle size distribution in the fluidized mass, the process may be provided with an arrangement for feeding into the fluidized mass controlled quantities of small particles of product material. This material may be obtained by grinding suitable quantities of the final product of the process to the required small particle size and recharging this into the fluidized mass.

A stream of fluidized particles is continuously withdrawn from the cement forming reaction zone and is subjected to a separating step wherein the coarser particles, for example, those larger than 140 microns diameter, are separated from the finer particles. These coarser particles are discharged from the process as its final product. The finer particles are returned to the fluidized mass in the cement forming reaction zone to be subjected to further reaction. By these means I provide for removing as product of the process only the relatively large particles, while at the same time, by returning the finer particles, the fluidized mass in the reaction zone is maintained at the most suitable particle size distribution for its effective operation while permitting the continual growing of the particles as outlined above. Furthermore, by these means I insure that the material withdrawn as final product from the process is homogeneously reacted throughout and free of unreacted oxides or feed materials, since the feed materials are of smaller particle diameter than the product withdrawn, as stated above.

The selective product withdrawal and recycling arrangement also automatically provides a safeguard against any building up of excessively large particles in the fluidized mass, because by continuously withdrawing a relatively large stream of fluidized material from this mass (compared to the stream of final product discharged from the process) out of which all larger particles are removed, and returning the remainder of this large stream back to the reaction zone minus the larger particles it contained, a continuous screening operation for removing excessively large particles takes place.

In addition to the safeguard against the building up of excessively large particles which is automatically provided by the selective product withdrawal and recycling arrangements described above, the process may also be provided with separate means for removing excessively large particles or agglomerates which may be formed as a result of operating variations or inadvertent mis-operation. Due to such variations or mis-operation it is possible, due to the nature of the cement forming reactions, that excessively large particles or agglomerates are abruptly formed, and these may not be caught by the selective product withdrawal and recycling arrangement but instead they may descend rapidly in the fluidized mass, and if of sufficient size, may fall into the air inlet against the upward flowing air stream entering the bottom of the fluidized mass. In due course of time such particles or agglomerates would accumulate in the air inlet to the extent of interfering with the operation of the process and thus cause a premature shutdown of the plant. To avoid such premature shutdown the air inlet may be provided with a trap in which such particles or agglomerates are collected and from which they may be removed without interrupting the continuous operation of the process.

Referring now to the drawing, the powdered feed materials are charged into the process from feed hopper 1 through standpipe 2 which is provided with control valve 3. The feed powder enters the air line 4 through which air is charged into the bottom of reactor 5. Standpipe 2 is of sufficient height to provide the necessary static pressure head to force the feed powder into line 4. As an alternative arrangement, the feed powder may be charged directly into reactor 5 by means of pump 6 and line 7.

A mass of particles, consisting predominantly of product material, is maintained in a fluidized state in reactor 5 by the air and other gases flowing upwardly through this reactor. Reactor 5 may consist of a cylindrical vessel placed in a vertical position and provided with a conical bottom and internally lined with refractory material. The level of the fluidized mass is maintained in the upper part of reactor 5. Fuel is supplied to the fluidized mass in reactor 5 through line 8 and control valve 9. The combustion of the fuel and air within the fluidized mass generates the heat required to maintain the fluidized mass at the desired reaction temperature.

The combustion gases and the carbon dioxide gas generated in the fluidized mass by combustion and by calcination of the carbonates leave the top of reactor 5 through line 10, pass through the tubes in heat exchanger 11 and flow on through line 12. In heat exchanger 11 the heat contained in the gases is used to generate steam. The shell side of heat exchanger 11 is connected with steam disengaging drum 13 by lines 14 and 15. The steam generated flows on to subsequent equipment through line 16 which is provided with a back pressure valve 17. Water is charged into the steam generating equipment through line 18 and valve 19.

The gases flowing through line 12 may be passed through a dust collector 20 in which dust and fine particles leaving reactor 5 in suspension in the gases may be collected. Collector 20 may be of the electrical precipitator type or any other suitable design. The gases are exhausted from the process through line 21. The dust and fine particles collected may be returned to reactor 5 through line 22, pump 23 and line 24, or they may be discharged from the process through line 25 and valve 26.

A stream of fluidized material is continuously withdrawn from reactor 5 through standpipe 27 which is provided with a flow control device 28, and is charged into line 29 through which a part or all of the air which is supplied to reactor 5 is first made to flow into separator 30. The air entering separator 30 will thus carry in suspension all the fluidized material withdrawn from reactor 5 through standpipe 27. Standpipe 27 is of sufficient height to provide the necessary static pressure head to force the material withdrawn from reactor 5 into line 29.

Separator 30 may be of the cyclone type or any other suitable design. In separator 30 the coarser particles are separated and are discharged from the process through line 31 and valve 32. The air stream, carrying the finer particles in suspension, leaves the top of separator 30 through line 33 and flows into air line 4 and continues on into the fluidized mass in reactor 5.

The air required for the operation of the process is charged into the plant by compressor 34 through line 35. A part or all of the air flows through line 36 and valve 37 into line 29.

A part of the air supplied by compressor 34 may be made to bypass separator 30 by causing it to flow from line 35 through lines 38 and 39 and valve 40 into line 33, and thus the air flowing through separator 30 and the bypassed air flowing through lines 38 and 39 will together flow into line 4.

The bypassed air flowing through line 38 may be heated by indirect heat exchange before it joins the air flowing from separator 30 through line 33, by closing valve 40 on line 39 and opening valves 41 and 42 whereby the bypassed air is made to flow through heating coil 43 in furnace 44.

Line 4, through which air flows into the bottom of reactor 5, is provided with an extension 45 which, in conjunction with gate valves 46 and 47 serves as a trap through which large particles or agglomerates may be discharged from the process without interrupting the continuous operation of the process. As previously referred to, it is possible that excessively large particles or agglomerates may be formed from time to time in the fluidized mass in reactor 5, and if these are of sufficient size and weight they may fall downward against the upward flowing air in line 4. The trap arrangement may be operated by keeping valve 47 closed and valve 46 open, but periodically closing valve 46 and opening valve 47 to discharge any particles or agglomerates which may have collected on valve 47, after which valve 47 is again closed and valve 46 opened.

Fine particles of product material may be charged into reactor 5 through line 48, pump 49 and line 50. The material so charged may be obtained by grinding a part of the product material discharged through line 31 and valve 32 to the particle size required for this purpose. (It is to be understood, of course, that all the product material discharged from the process will be ground to an extremely fine powder, but since this is common practice in the cement manufacturing industry it is no part of the present disclosure. However, such final grinding is usually carried out in a stepwise manner wherein the product is ground in stages to a finer and finer powder, and it is therefore likely that in one of such conventional grinding stages the material is of the right degree of fineness, and yet not too fine, to be used for returning to the reaction zone as herein disclosed. Such a procedure would then, in effect, constitute a recycling operation wherein a part of the product material is returned to the reaction zone from one of the grinding stages through which the product material must pass in the course of its being reduced to the extremely fine powdered condition in which it is placed on the market as hydraulic cement.)

The material conveyed through standpipes 2 and 27 may be kept in a free flowing static head condition by charging an aerating gas, such as air, into the bottom of these standpipes in accordance with well established practice.

Various parts of the equipment, as well as reactor 5, may be internally lined with suitable refractory material wherever necessary because of high temperatures, and the apparatus is generally well insulated against radiation losses.

The apparatus herein described and shown on the drawing represents an arrangement of equipment suitable for carrying out my invention, but certain alternative types of equipment or arrangements may also be used without thereby circumventing the scope of my invention or departing from the essence of my disclosure. For instance, the heat contained in the high temperature gases discharging from the top of reactor 5 is shown as being utilized for the generation of steam which may be used as a source of power to drive other equipment which is related to, but not an integral part of my invention, such as the equipment used for grinding the feed materials or the product material, while at the same time air is shown to be preheated in coil 43 in furnace 44. It will be obvious to those skilled in the art that in some cases, depending for instance on the relative cost of outside electric power and of fuel, it may be more advantageous to preheat the air by heat exchange with the gases leaving reactor 5, and to use outside electric power to drive the grinding equipment.

In describing my invention I have shown certain alternative arrangements which are valuable in obtaining the most effective overall performance of the process. One of these alternatives is the provision for bypassing a part of the air charged to the process around separator 30. The balance of the process is such that the total amount of air required for the operation of the fluidized mass in reactor 5 is considerably in excess of the minimum amount of air required for the operation of separator 30, that is, to carry the material withdrawn from reactor 5 into separator 30, to effect the proper particle size separation in this separator and to carry the finer particles back to reactor 5. A part of the total air charged to the process may therefore be made to bypass the separating equipment in order to reduce its required size and loadings, and furthermore, by varying the percentage of air which bypasses the separating equipment, an operating control over the degree of particle separation may be obtained.

Another alternative is provided in that the bypassed air may be preheated before being charged into reactor 5. The total amount of air which must be charged into reactor 5 depends on the mount of heat which is to be generated within this reactor, and if the materials entering reactor 5 (including the air supply) are not preheated then the amount of air required for combustion with sufficient fuel to generate the necessary heat is far in excess of the minimum amount of air necessary to maintain a fluidized mass of adequate size on this reactor, and hence a reactor of relatively large diameter must be employed in order that the upward flow of gases through the fluidized mass does not exceed the maximum allowable velocities. It may be desirable, particularly in the design of large capacity plants, to reduce the required diameter of reactor 5, and this may be accomplished by means of preheating the air in indirect heat exchange equipment (that is, by preheating the air without reducing its oxygen content). In this way the amount of heat which must be generated within reactor 5 is reduced by the amount of heat which has been imparted to the air in the indirect heat exchange equipment outside reactor 5. As a result, the fuel and air which must be burned within reactor 5 may be reduced, and the reduction of air rate so obtained permits a reduction of the diameter of reactor 5 without thereby causing the upward flow of gases through the fluidized mass to exceed the maximum allowable velocities.

This application is a continuation-in-part of my prior application Serial No. 264,144, filed December 29, 1951, now abandoned.

Having thus described my invention, what I claim is:

1. A process for the production of hydraulic cement from raw uncalcined materials including carbonates and oxides which comprises establishing a bed of fluidized particles predominantly of hydraulic cement of a chemical composition substantially the same as the hydraulic cement to be produced, maintaining said bed in a fluidized state by charging air into the bottom portion thereof, charging into said bed the raw uncalcined materials in powdered form, charging fuel into the fluidized bed for combustion with air within the bed, the relative amounts of fuel and air supplied to said bed being sufficient to maintain said bed at a temperature high enough to bring about calcination of carbonate materials and to maintain the fluidized bed at cement reaction temperatures, whereby the added carbonate materials are first calcined and the resultant oxides and the oxides of the raw materials react in said bed to form hydraulic cement, discharging combustion gases and carbon dioxide resulting from the calcination from above the reaction zone and the fluidized bed, and discharging a portion of the fluidized bed from the reaction zone as final product of the reaction.

2. A process for the production of hydraulic cement as set forth in claim 1 in which the fluidized bed includes a major portion of particles of hydraulic cement of a particle size larger than the particle size of the cement raw materials added to the fluidized bed, and the cement raw materials are charged into the lower portion of the bed.

3. A process for the production of hydraulic cement as set forth in claim 2 in which the cement raw materials are smaller than 140 microns.

4. A process for the production of hydraulic cement as set forth in claim 1 in which the portion of the fluidized bed withdrawn as the final product consists primarily of larger particles of the fluidized bed.

5. A process for the production of hydraulic cement as set forth in claim 1 in which the finer particles of the discharged portion of the bed are separated from the larger particles of such portion and are returned to the fluidized bed.

6. A process for the production of hydraulic cement as set forth in claim 5 in which the withdrawn finer particles are separated from the withdrawn coarser particles by elutriation and the air from such separation and containing the entrained finer particles is used at least in part for maintaining the bed in a fluidized state, whereby the separated finer particles are returned to the fluidized bed by fluidizing air.

7. A process for the production of hydraulic cement as set forth in claim 6 in which the air elutriation of the withdrawn material takes place while the withdrawn particles still retain a large portion of their heat, whereby at least a portion of the air used for fluidizing the bed is preheated.

8. A process for the production of hydraulic cement as set forth in claim 1 in which the amount of cement raw material added to the fluidized bed per minute is a relative small amount compared to the amount of material in the bed.

9. A process for the production of hydraulic cement as set forth in claim 1 in which finished hydraulic cement product of fine particle size is introduced into said fluidized bed during operation.

10. A process for the production of hydraulic cement as set forth in claim 1 in which the finer particles of the discharged portion of the bed are separated from the larger particles of such portion and are returned to the fluidized bed, and a part of the coarse particles from which the fine particles are separated is ground to a fine particle size and is charged into said fluidized bed.

11. The process for the production of hydraulic cement as set forth in claim 1 in which large particles or agglomerates formed during the operation are separately removed from the bed without interrupting the continuous operation of the process.

References Cited in the file of this patent

UNITED STATES PATENTS

| | | |
|---|---|---|
| 2,282,584 | Hill | May 12, 1942 |
| 2,409,707 | Roetheli | Oct. 22, 1946 |
| 2,498,710 | Roetheli | Feb. 28, 1950 |
| 2,548,642 | White | Apr. 10, 1951 |
| 2,631,981 | Watson et al. | Mar. 17, 1953 |
| 2,661,324 | Leffer | Dec. 1, 1953 |

FOREIGN PATENTS

| | | |
|---|---|---|
| 488,320 | Great Britain | July 5, 1938 |